United States Patent [19]

Dirck

[11] Patent Number: 5,080,416
[45] Date of Patent: Jan. 14, 1992

[54] PRISONER TRANSPORT MODULE

[76] Inventor: Ronald L. Dirck, P.O. Box 196, Warsaw, Ind. 46580

[21] Appl. No.: 597,675

[22] Filed: Oct. 15, 1990

[51] Int. Cl.$^5$ .............................................. B60P 3/00
[52] U.S. Cl. ................................. 296/24.1; 52/106
[58] Field of Search ................ 296/24.1, 39.1, 164; 52/106; 119/15, 17, 19

[56] References Cited

U.S. PATENT DOCUMENTS

| | | | |
|---|---|---|---|
| 2,219,412 | 10/1940 | Dean | 52/106 X |
| 4,015,875 | 4/1977 | Setina | 296/24.1 |
| 4,035,014 | 7/1977 | Sellers | 296/24.1 |
| 4,159,141 | 6/1979 | Dirck | 296/24.1 |
| 4,163,577 | 8/1979 | Vanderslice | 296/164 |
| 4,470,228 | 9/1984 | Dirck | 296/24.1 X |
| 4,746,161 | 5/1988 | Futrell | 296/24.1 |
| 4,917,431 | 4/1990 | McDonald | 296/39.1 |
| 4,938,518 | 7/1990 | Willemsen | 296/24.1 |

Primary Examiner—Margaret A. Focarino
Assistant Examiner—Joseph D. Pape
Attorney, Agent, or Firm—James D. Hall

[57] ABSTRACT

A pre-fabricated kit for the assembly of a portable prisoner module which is adaptable to use in a conventional van-type vehicle. The kit comprises a series of panels which, when assembled in such a vehicle, forms a box-like container with visual communication between the interior of the container and the van drivers compartment and a rear door unit providing ingress to and egress from the interior of the container. The kit contains two door units, one with a single door and the other with dual side by side doors and a divider for use with the latter. When the divider and the dual-door unit are utilized, the module is divided into two compartments to which access is permitted selectively and individually.

4 Claims, 4 Drawing Sheets

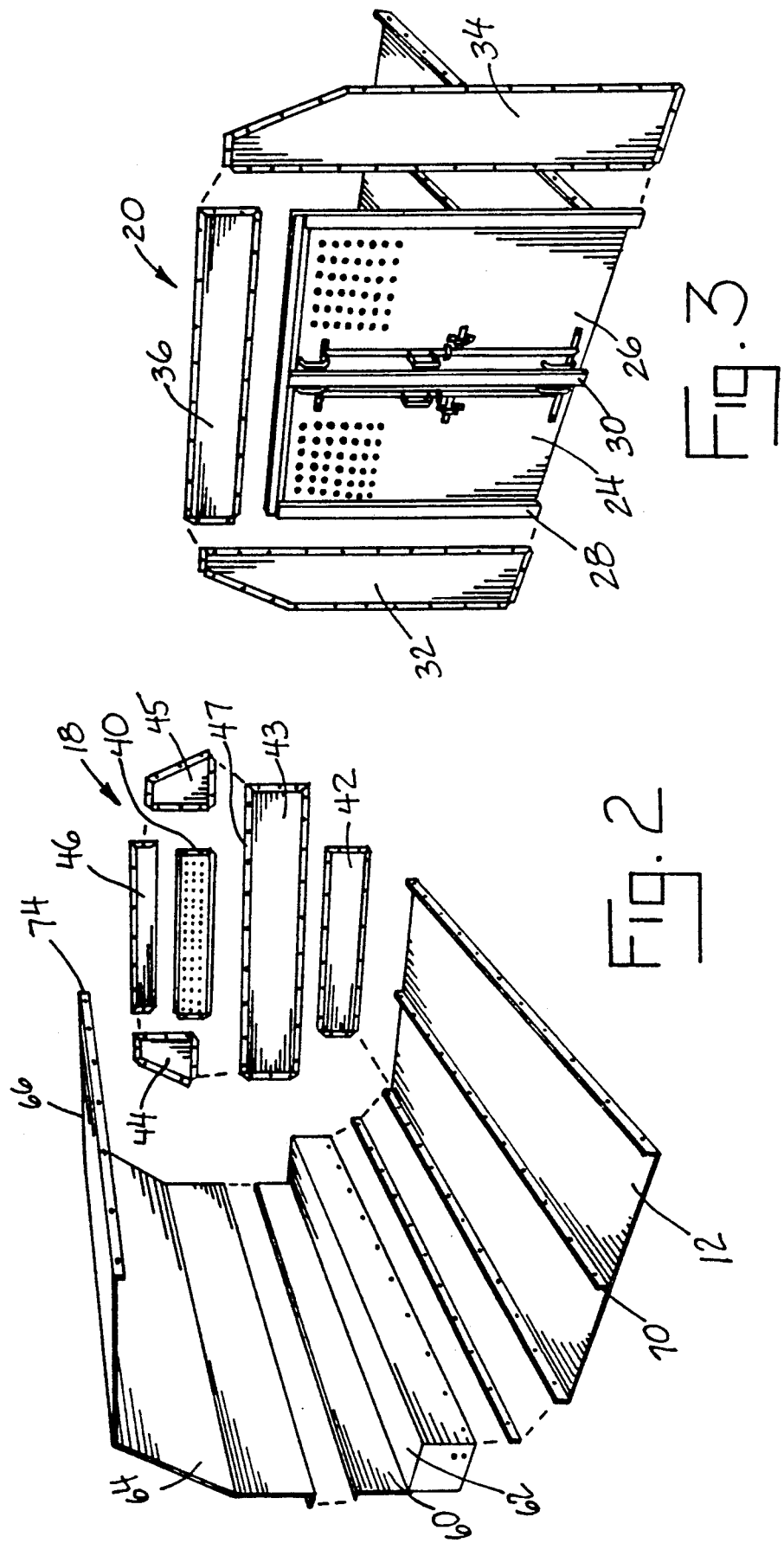

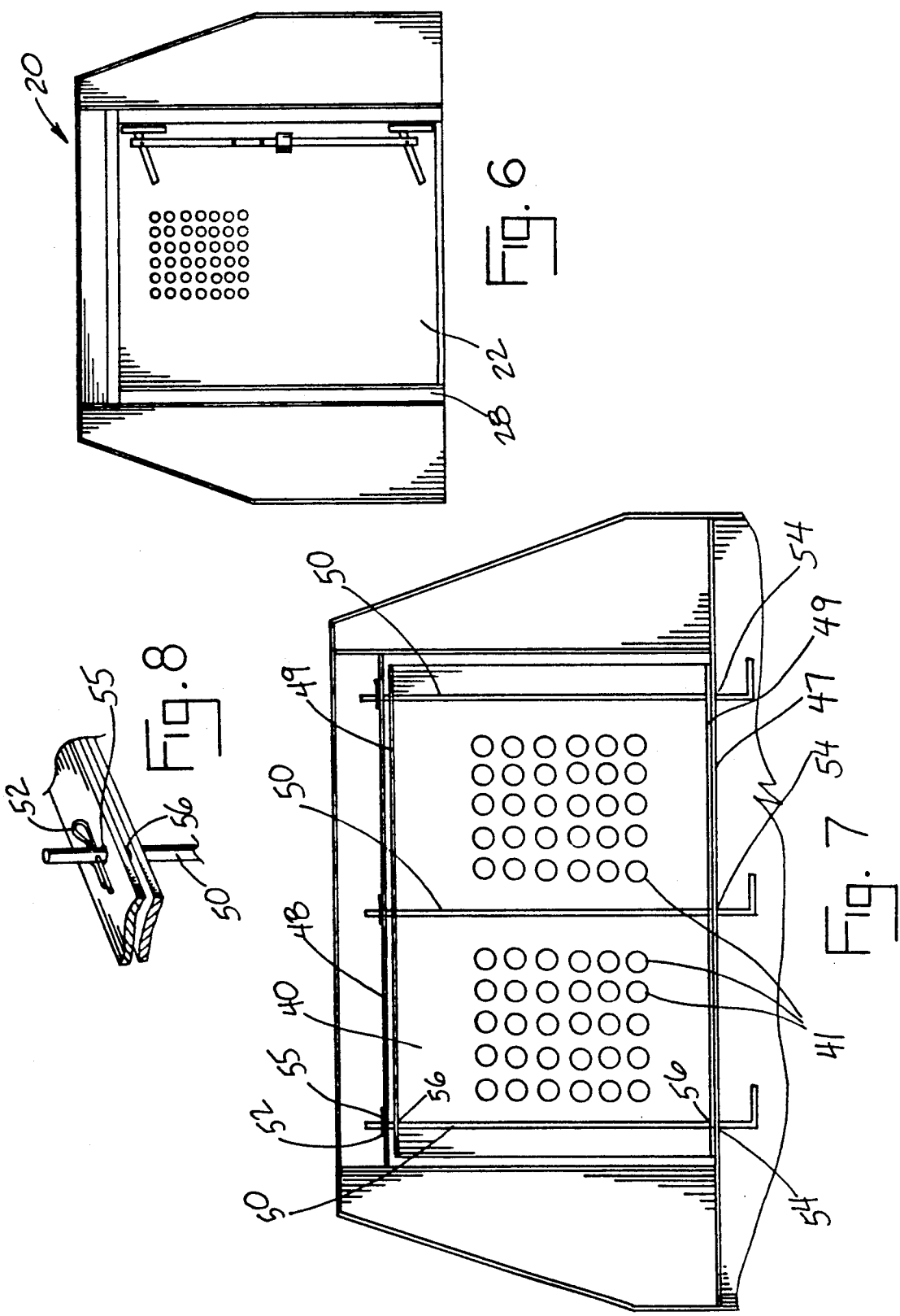

PRISONER TRANSPORT MODULE

BACKGROUND AND SUMMARY OF THE INVENTION

This invention relates to a portable prisoner transport module for use in combination with a motor vehicle and more specifically to a module which is pre-fabricated for ready assembly within such a vehicle.

The transport of prisoners, either from a jail to a courthouse or from one facility to another, has always presented law enforcement officers with a peculiar and special problem. A large proportion of escapes take place during such transport, as security is most vulnerable at this time. Escape is only one of the problems, another being the assault upon an officer or officers.

In the past, numerous features have been incorporated into police vehicles to secure a prisoner. In many situations, the heavy mesh screening between the driver and passenger compartments, coupled with locking mechanisms, is sufficient to transport an individual from the scene of an accident or crime to the police station. Such security is neither effective or sufficient for the transport of prisoners.

Various means of transport have been developed, some comprising a van conversion and others comprising a van module. Such transports are referred to by law enforcement officers as brigs, and shall be so referenced in this specification.

In more recent times, vans have been converted to brigs by reinforcement of the interior rear compartment of the van and by the addition of heavy partitions and doors. Such a van is described in detail in U.S. Pat. No. 4,159,141, of which this applicant is the named inventor and which is assigned to the same assignee.

There is one major disadvantage to such a brig, and it has nothing to do with the security thereof. Such conversions are built in at a relatively high cost and commit the vehicle to a single use, one which does not see frequent need, especially in smaller communities. Budgetary constraints resulted in a failure of many such smaller communities to purchase brigs, thereby endangering law enforcement officials and risking the loss of prisoners.

As a result, a portable module was developed, one which could be inserted and removed, as needed, from a standard van. This meant that the vehicle could be used for a variety of normal operations, as well as in the capacity of a brig. Such a module is described in detail in U.S. Pat. No. 4,470,228, of which this applicant is the named inventor and which is assigned to the same assignee.

It has been found, however, that, unless the rear of a van is extensively modified, the size of the module is severely restricted by the size of the opening. In other words, the dimensions of the brig are limited to the size of the opening. This means that the size of the brig is considerably less than it was in the previous van conversion, resulting in less carrying capacity, less breathing space and a vertical dimension which prevents some prisoners from sitting in a fully upright posture. Furthermore, these brigs are molded into a permanent module, present problems of removal and require a considerable and significant storage problem.

The module of this invention serves to provide a prefabricated van brig in kit form which is easy to assemble and disassemble in the van. Because of its panel structure, it is easily handled and, when stored, takes a minimum of space.

When the brig is not installed in the van, the van may be used for any other purpose intended. When the brig is needed, it is easily assembled in a very short period of time. The brig is assembled by use of identical nuts and bolts, so that there are no special connectors, connections or tools needed. The doors are pre-assembled as a unit and installed as such, so that there is no particular expertise required for door installation. No welding or fitting is required.

Accordingly, it is an object of this invention to provide a portable brig in kit form.

Another object is to provide a pre-fabricated, panelled brig which may readily and easily be stored, then assembled within a van.

Another object is to provide a method for assembling a pre-fabricated brig within a van.

A further object is to provide a brig which is economical in cost and simple to assemble and use.

Other objects will become apparent upon consideration of the detailed description of the preferred embodiment of the present invention.

BRIEF DESCRIPTION OF THE DRAWINGS

The present invention is illustrated hereinafter by a detailed description of the preferred embodiment, which is presented in conjunction with, and by reference to, the accompanying drawings, in which like reference characters refer to like or corresponding parts, and wherein:

FIG. 2 is an exploded perspective view of the floor, left side panels (of which the right side panels are a mirror image) and front wall of the prisoner transport module.

FIG. 3 is an exploded perspective view of the rear wall of the prisoner transport module, illustrating a double-door configuration.

FIG. 6 is an end view of the rear wall of the prisoner transport module, illustrating said wall with a single door configuration.

FIG. 7 is an enlarged partially cut away end view of the front wall of the prisoner transport module, illustrating the security panel and the means for holding it in place.

FIG. 8 is an enlarged perspective view of the means for holding the security panel in place.

DETAILED DESCRIPTION OF THE PREFERRED EMBODIMENT

The preferred embodiment illustrated is not intended to be exhaustive or lo limit the invention to the precise form disclosed. It has been chosen and is herein described in order to best explain the invention and its practical use to enable others skilled in the art to best utilize the invention.

In its assembled condition, portable prisoner transport module 10 (hereinafter referred to as the module) is in the standard shape of a rectangular elongated box, closely approximating the shape of the interior rear compartment of a van 6.

In its unassembled condition, the module is comprised of pre-fabricated panels (see FIG. 2) which are readily and easily assembled by use of standard nuts and bolts (not shown).

Figure 1:
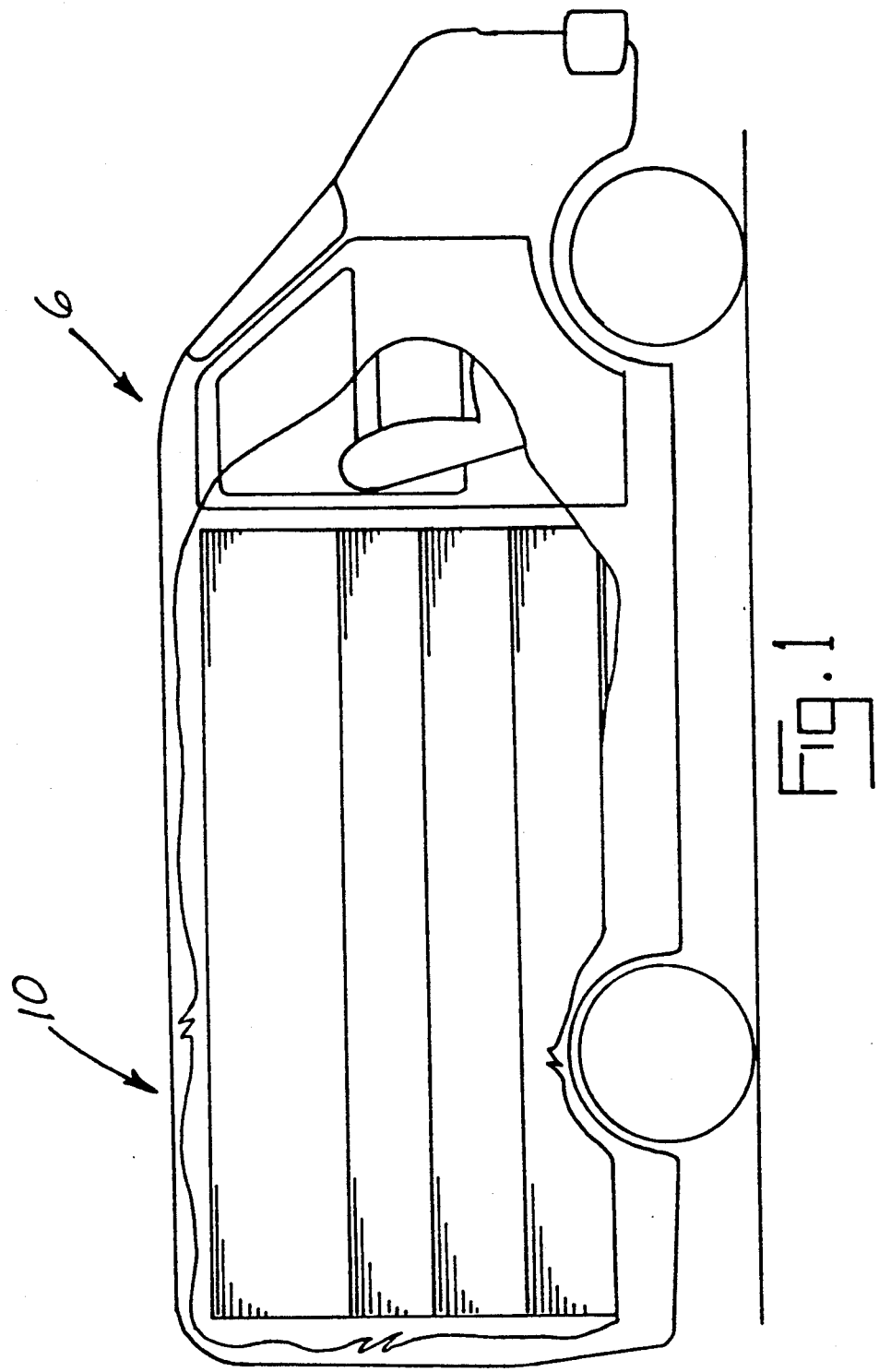
FIG. 1 is a side view of a van, partially cut away to illustrate a prisoner transport module assembled therein.
Figure 5:
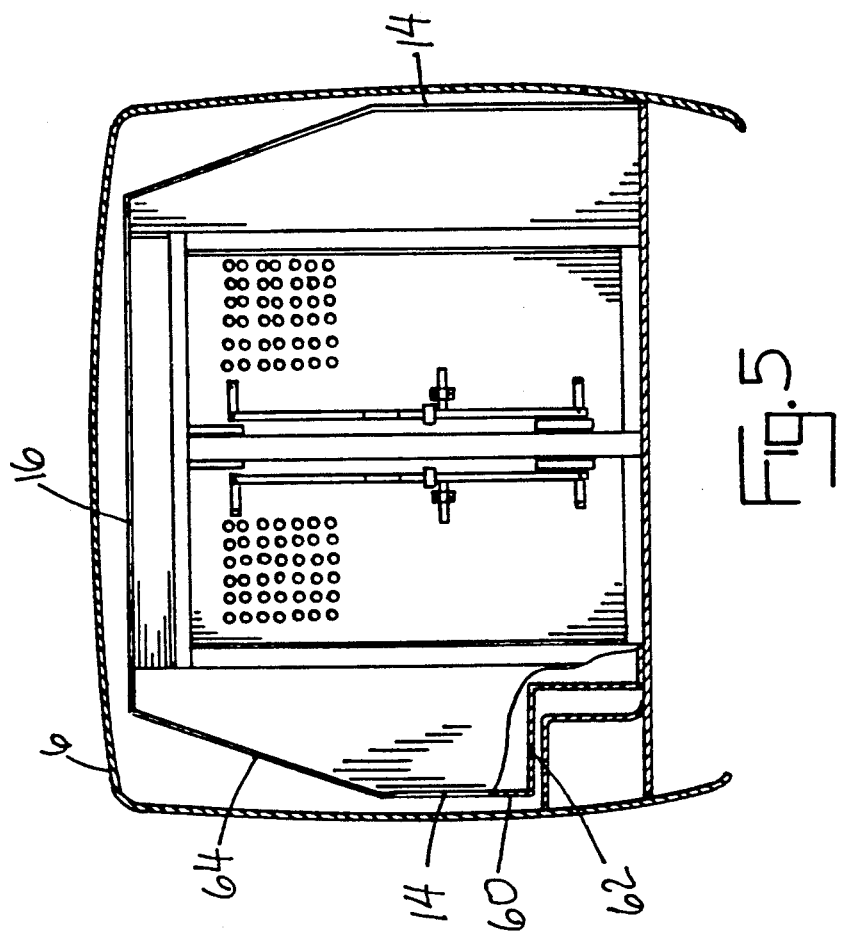
FIG. 5 is an end view of the rear wall of the prisoner transport module, illustrating its assembly within a van and partially cut away to illustrate the bench portion of said module.
Figure 4:
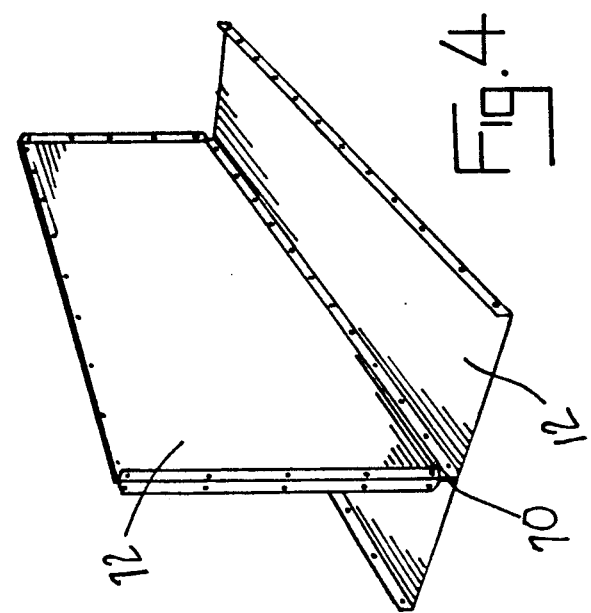
FIG. 4 is a perspective view of the floor of the prisoner transport module, illustrating the placement of a partition utilized to create separate compartments.

Assembled, the module is defined by a floor 12, side walls 14, a top 16, a front wall 18 and a rear wall 20. Rear wall 20 is preferably comprised of four basic panels, one of which includes a door 22 or doors 24, 26 (which will be subsequently explained in more detail) and a frame 28 therefor, two side panels 32, 34 and an upper panel 36. As illustrated in FIGS. 3, 5 and 6, there is a two door configuration and a single door configuration.

Front wall 18 is preferably comprised of six basic panels. One of the panels, generally located in the upper center of the wall and referred to herein as a security panel 40 is provided with a multiplicity of small circular openings 41. These openings provide visual communication to the interior of module 10.

In the event of an accident, especially a rear end collision, the prisoners may have to be evacuated from module 10. Security panel 40 is accordingly provided with means for releasing it from front wall 18. Security panel 40 is held in place on front wall 18 by a plurality of rods 50, inserted through corresponding openings in security panel 40 and in the adjacent upper and middle panels 46, 43. When rods 50 are inserted and snap pins 52 inserted therein, security panel 40 is held fast in place. When snap pins 52 are removed, rods 50 are readily removed and security panel 40 may be removed from front wall 18.

A plexiglass shield may be installed over the area of security panel openings 41 in order to protect the driver from verbal and physical abuse.

Lower panel 60 of each side wall 14 includes a seating bench 62. Upper panel 64 of each side wall 14 is attached to lower panel 60 and extends to the center of top wall 16, thereby forming the upper half of side wall 14 and the ceiling or top wall 16 of module 10 as a single unit. That is to say, when both upper panels 64 of side walls 14 are attached to lower panels 60 of the respective side walls, they meet to form the roof, or, top wall 16, of module 10.

It will be observed that floor 12 has a center spine 70 extending the length of the floor. The reason for this will be fully explained subsequently.

There are situations and instances where it will be desired to separate one or more prisoners from one or more other prisoners. For such instances, a divider panel 72 is provided. Divider panel 72 is bolted to floor 12, to front wall 18, to the meeting point 74 of upper side panels 64 and to rear wall 20.

It is in this configuration that the double door rear panel is utilized. The double door panel is assembled at the factory and is provided with a frame 28 and a center post 30. Doors 24, 26 are hinged to the side frame and independently securable at the center post. Such a configuration, coupled with center divider panel 12, which is bolted to center post 30 of door panel 20, permits access to one compartment while the other remains locked and secured.

If the undivided brig is employed, that door panel 20 which includes a single door 22 is utilized. It will be seen that the dimensions of rear door panels 32, 34, 36 are the same, so that door panels 20 are interchangeable.

In operation, floor 12 is placed inside van 6, upper panels 64 of side walls 14 are bolted to the respective lower side walls 60 and either one or &he other or both are placed in van 6 and bolted to floor 12. Upper side walls 14 are loosely joined at the top center 74 to stabilize module 10, with enough slack so that the components may be adjusted as they are assembled.

The panels of front wall 18 are bolted to side panels 14 from bottom to top. That is to say, lower front panel 42 is bolted to lower side panels 60 and to floor 12. Middle panel 43 is bolted to side panels 60, 64 and to lower front panel 42. Small trapezoidal shaped side panels 44, 45 are bolted to upper side panels 64 and to middle panel 43.

Center top panel 46 is then bolted to trapezoidal side panels 44, 45 and to the uppermost portion 66 of upper side panels 64. This secures front wall 18 to side walls 14 and the floor 12 of module 10 and leaves a narrow elongated rectangular opening in the upper center of the front wall 18.

The upper edge of middle panel 43 is provided with an outward facing flange 47 in which there are a plurality of bores 54. Lower edge of center top panel 46 is provided with an outward facing flange 48 in which there are a plurality of bores 55 corresponding with bores 54 in flange 47 of middle panel 43.

Security panel 40, previously described, is provided with outward facing flanges 49 which are provided with bores 56 corresponding to bores 54 in flanges 47, 48 of middle panel 43 and upper center panel 46 respectively. Security panel 40 is inserted in the opening provided therefor and rods 50 are inserted upwardly through the respective bores 54, 55, 56. Means are provided, such as snap pins 52, to secure rods 50 and to prevent their inadvertent removal.

If divider panel 70 is to be incorporated into module 10, it is slid into place and bolted to floor 12, to the tops 66 of upper side panels 64 and to front wall 18.

To assemble rear wall 20, side panels 32, 34 are bolted to upper side walls 64, lower side walls 60 and to floor 12. Center top section 36 is bolted to the uppermost portions 66 of upper side panels 64 and to rear wall side panels 32, 34. The factory-assembled double door unit is placed into the opening in the rear wall and bolted to center top section 36 and to rear wall side panels 32, 34. Divider panel 72 is bolted to center post 30.

All bolts are then tightened and the assembled module is secured to the floor of van 6.

If a single compartment module is desired, all steps up to the insertion of divider panel 72 and the double door unit are as previously described. For a single compartment module, the factory assembled door unit contains only one door 22. Otherwise, the dimensions of the door unit remain constant.

In operation, divider panel 72 is left out and the single door unit is placed into the opening in rear wall 20 and bolted to center top section 36, to rear wall side panels 32, 34 and to floor 12. All bolts are then tightened and the assembled module is secured to the floor of the van 6.

It will be understood that the prisoner transport module incorporates many features which do not form a specific part of this invention and which are not shown in the drawings. For example, there are provisions for interior lighting and for radio and intercom systems. The module is normally provided with a blower unit which provides heated or cooled air into the interior thereof. All of these features are plugged or attached to pre-fabricated wiring harnesses and are controlled from the dashboard of the van.

Wiring ingress openings are provided in the appropriate panels of the walls and means are provided to secure such from tampering or destruction by the prisoners within the module.

This invention is not to be limited to the precise for disclosed in the preferred embodiment or by the terms of the above description, but may be modified without departing from the scope of the appended claims.

I claim:

1. A portable prisoner transport module having a floor, a pair of side walls, a front wall and a rear wall, each side wall having an upper and lower panel, each panel having lower and upper ends, said lower panel including a bench, said lower panels being oppositely and spacedly positioned and fastened to said floor at their said lower ends, each upper panel being connected at its said lower end to said upper end of a said lower panel, each upper panel including a horizontal section forming a portion of a top wall and terminating in the panel's said upper end, said upper panels being connected at their said upper ends to form said top wall spacedly overlying said floor, said side walls being connected to said front wall and rear wall, and said rear wall carrying a door.

2. The combination of claim 1 wherein said transport module includes a divider panel extending from said front wall to said rear wall, said divider panel having lower and upper ends, said floor having a center spine, said lower end of said divider panel being connected to said center spine, said upper end of said divider panel being connected to the upper end of at least one upper panel.

3. The combination of claim 2 wherein said upper end of said divider panel is connected between the upper ends of said upper panels.

4. The combination of claim 1 wherein said front wall includes a removable security panel for providing access with the interior of said transport module, said security panel including means for allowing the removal of said panel from said front wall, said means including a plurality of rods inserted through openings in said security panel and said front wall for securing said panel to said front wall.

* * * * *